May 22, 1934.   R. BIRMANN   1,959,703
BLADING FOR CENTRIFUGAL IMPELLERS OR TURBINES
Filed Jan. 26, 1932   5 Sheets-Sheet 2
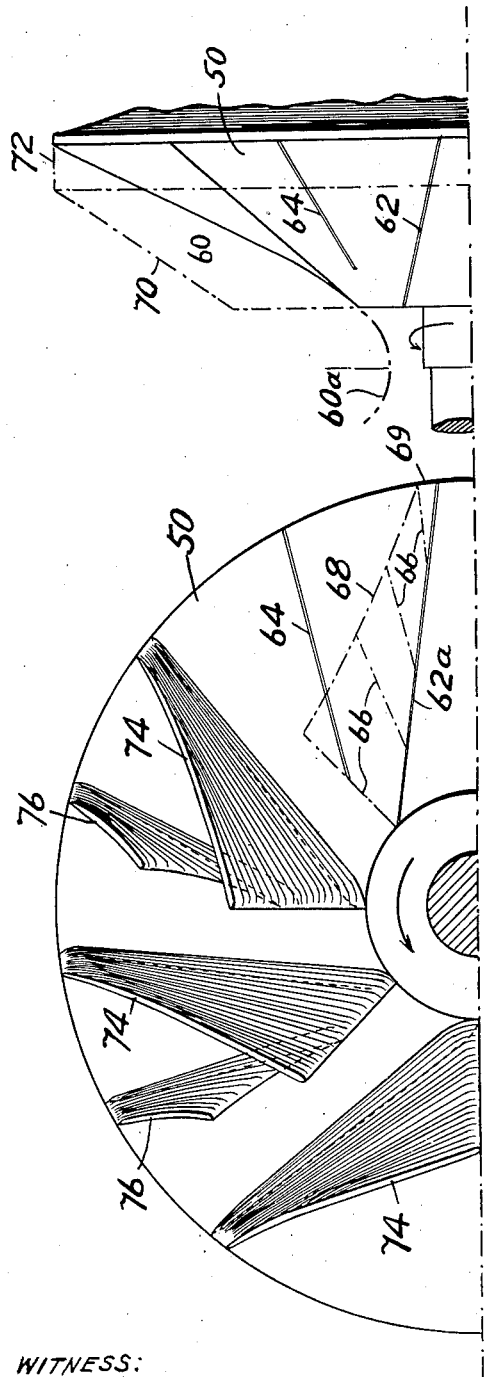
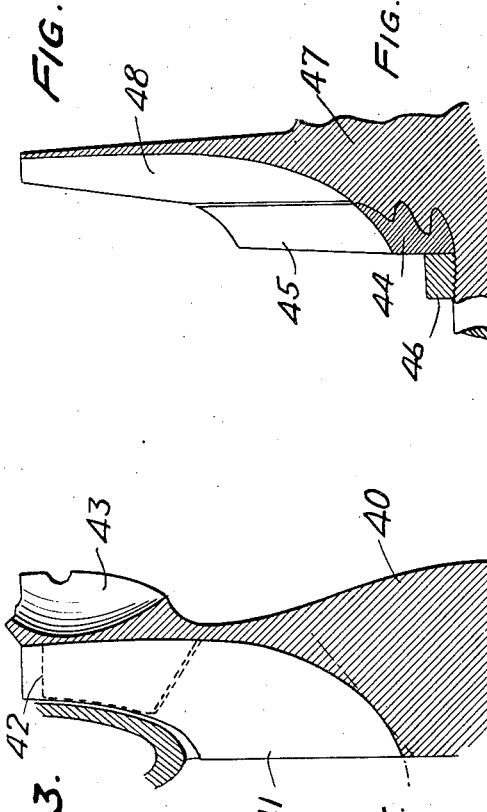
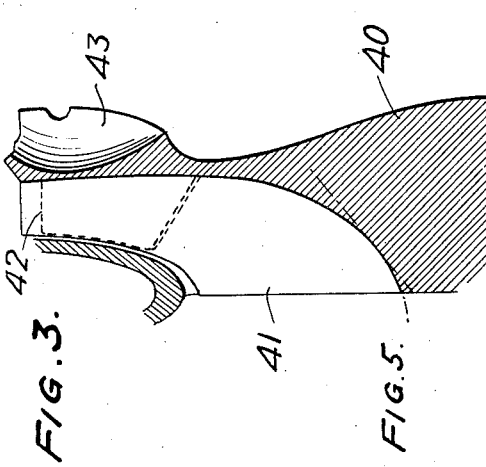
WITNESS:
INVENTOR
Rudolph Birmann
BY
Busser & Harding
ATTORNEYS.

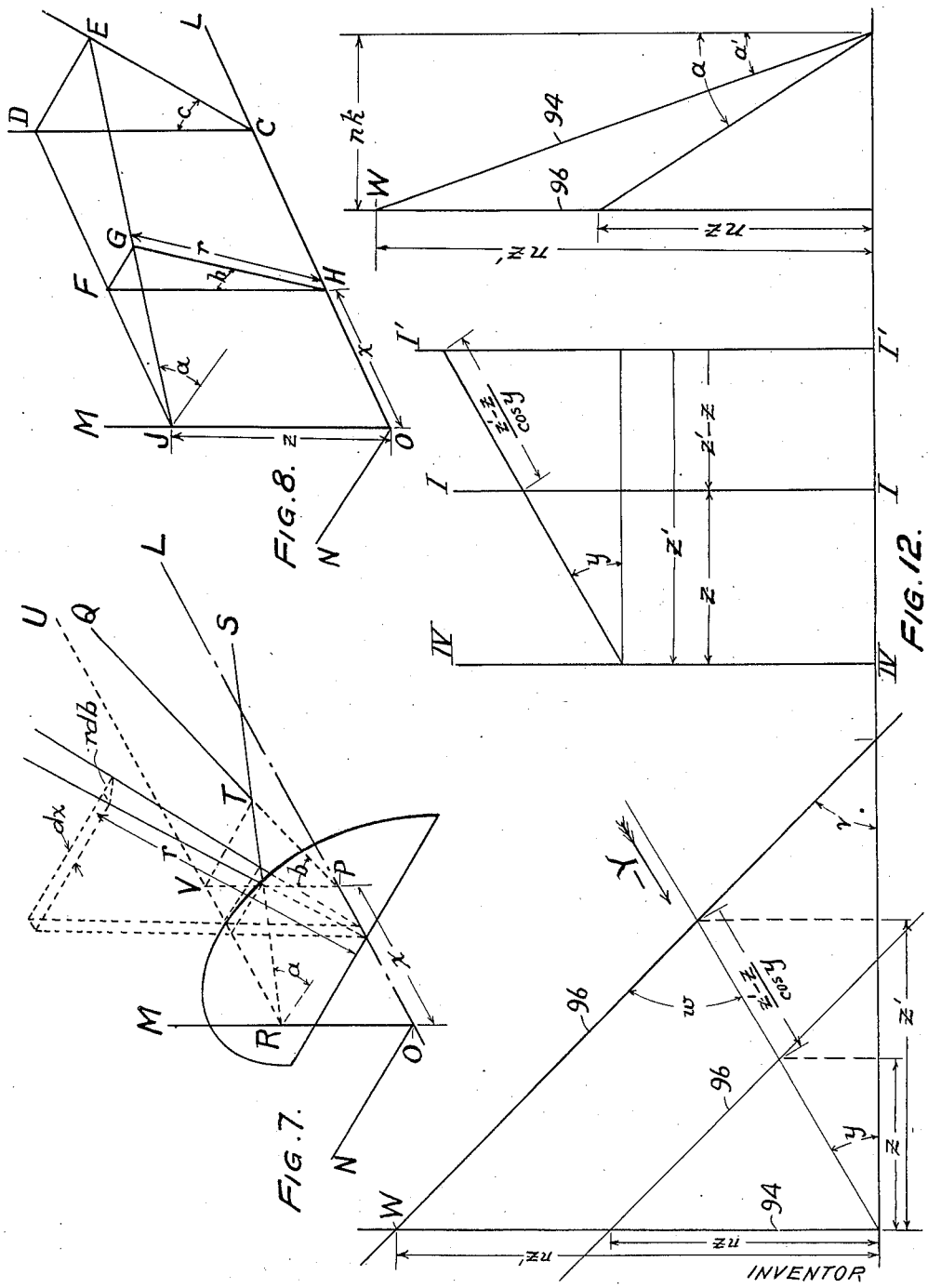

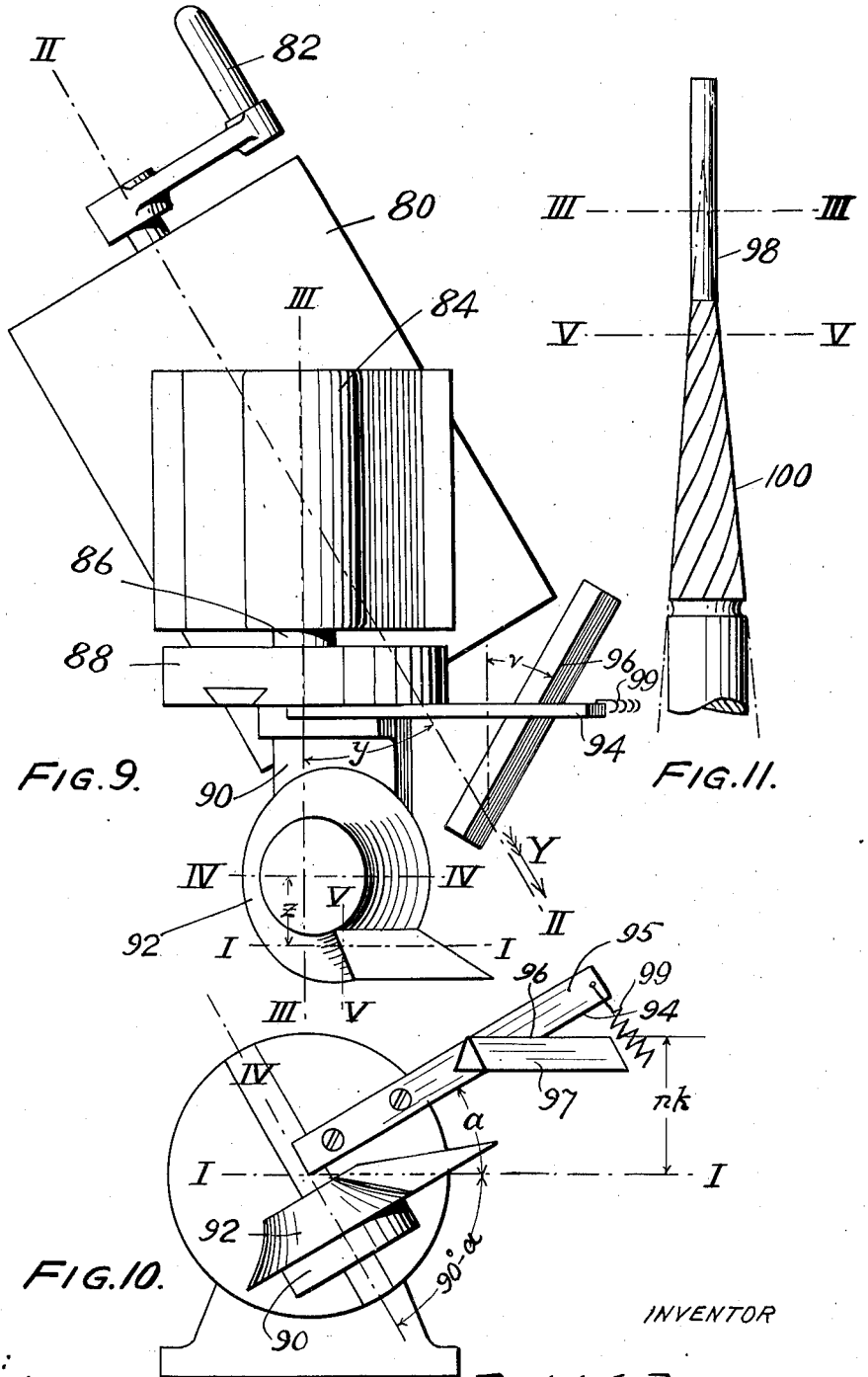

May 22, 1934.   R. BIRMANN   1,959,703
BLADING FOR CENTRIFUGAL IMPELLERS OR TURBINES
Filed Jan. 26, 1932   5 Sheets-Sheet 5
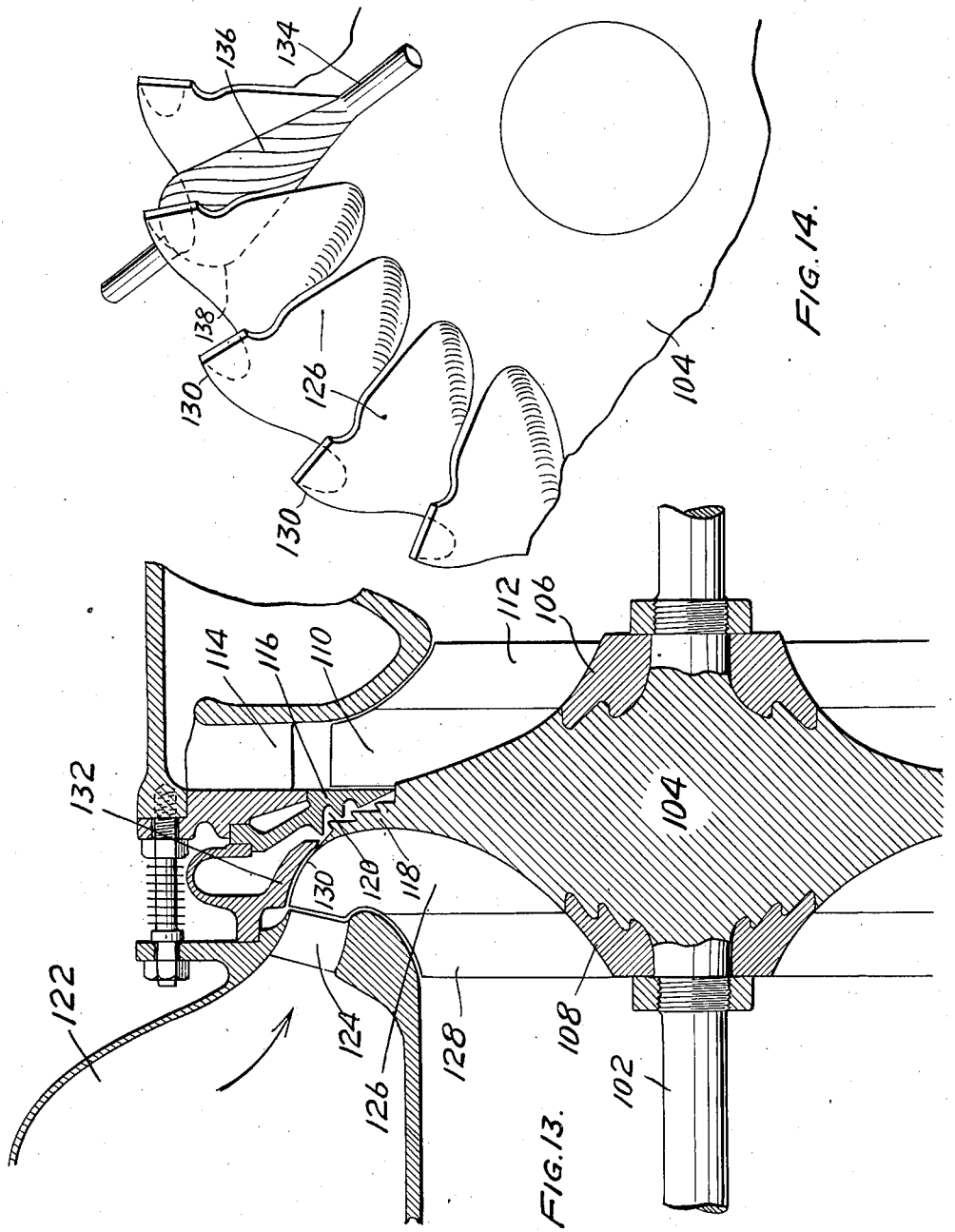
INVENTOR
Rudolph Birmann
BY
Busser + Harding
ATTORNEYS.
WITNESS:

Patented May 22, 1934

1,959,703

UNITED STATES PATENT OFFICE 1,959,703

BLADING FOR CENTRIFUGAL IMPELLERS OR TURBINES

Rudolph Birmann, Trenton, N. J.

Application January 26, 1932, Serial No. 588,855

13 Claims. (Cl. 230—134)

This invention relates to features of a turbo-compressor arrangement particularly adapted for use in a supercharging system for internal combustion engines in which a centrifugal compressor of one or more stages is driven by a turbine receiving exhaust gases from the engine. While the features are specifically illustrated as applied to this arrangement, they are of more general application in the design and operation of turbines and centrifugal compressors, either alone or in combination. The present case relates specifically to an improved construction for impeller blades or separating walls between turbine buckets of a type hereafter described, the construction being capable of use in turbines or impellers either alone or in combination such as that just outlined.

This application is in part a continuation of my prior applications, Serial Nos. 402,335 and 481,469, filed respectively October 25, 1929 and September 12, 1930.

In the first of these applications there is described and claimed an arrangement whereby the heat, pressure and velocity energy of the exhaust gases of an engine may be partially utilized to effect supercharging by driving a turbine which, in turn, drives a centrifugal compressor arrangement operative to compress air for the intake of the engine. This first application specifically describes means for storing up kinetic energy as well as pressure and heat energy for uniform feed to the turbine with resultant attainment of high turbine efficiency.

The arrangement of this supercharging system involves also a combination turbine and centrifugal compressor which is claimed in my second application referred to above. The improved design of a combined turbine and compressor rotor serves to cool the same below dangerous temperatures. In this second application there is also disclosed and claimed a novel turbine bucket construction provided by forming slots in the side of a disc, the gases entering the buckets at their outer portions and being discharged adjacent the axis of rotation.

A further feature of the invention consists of a novel construction for the boundary walls of passages for fluids whether such walls consist of the blades of a centrifugal impeller or the walls between buckets of the type indicated in the preceding paragraph in which entry and discharge occur at different radii. By the use of the novel boundary walls the occurrence of dangerous centrifugal stresses and resulting damage is avoided and impact and friction losses are reduced.

In my prior applications the novel boundary wall construction was illustrated in connection with impeller blades. The present application concerns not only the broad features of this construction but also details and particular arrangements of impeller blades for specific uses.

Inasmuch as the theory upon which the design of the boundary wall construction is based is applicable not only to impeller blades but also to turbine buckets of certain classes, there is illustrated in the present case a turbine bucket design having numerous advantages which will be brought out. It will be clear that the claims to the broad features of the novel boundary wall construction apply not only to impellers but also to turbines.

A further feature of the invention relates to a novel means of machining the improved boundary walls for both impellers and turbines whereby in spite of their relatively complex shape, they may be formed with facility and considerable rapidity from solid blanks.

Other objects of the invention relating particularly to details of construction will become apparent from the following description read in conjunction with the accompanying drawings in which:

Fig. 3 is a partial face view of a rotor illustrating a modified type of impeller construction;

Fig. 4 is a side elevation of the rotor of Fig. 3 with the blades removed to show constructional features;

Fig. 5 is an axial section of a further modified impeller construction;

Fig. 6 is an axial section of still another modification;

Figs. 7 and 8 are diagrams illustrating the mode of generation of the improved type of blade and certain of its properties;

Fig. 9 is a plan view of a portion of a machining arrangement for constructing the improved impeller blades;

Fig. 10 is an end elevation of the same;

Fig. 11 is a plan view of a tool used in cutting out the blades;

Fig. 12 is a diagram illustrating the production of the theoretical blade shape by the process carried out by the means illustrated in Figs. 9 to 11;

Fig. 13 is an axial section illustrating a turbine bucket arrangement in accordance with the invention; and Fig. 14 is a fragmentary elevation showing the method of machining turbine buckets.

Figure 1:
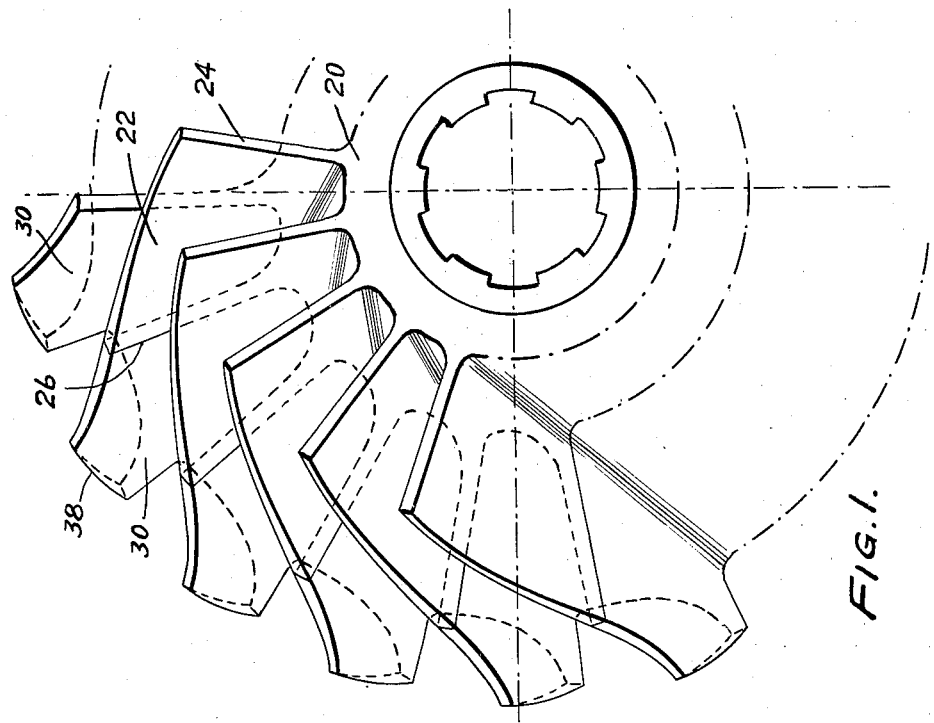
Fig. 1 is a view showing in elevation the inlet side of a portion of a rotor illustrating a preferred form of impeller construction.

In order to prevent confusion the invention will first be described as applied to impeller blades. Thereafter, the more general aspects will be considered in the application of the invention to turbine buckets.

Before proceeding to a description of the impeller blades of the improved design forming the subject of the invention, it will be well to first consider briefly the failures of impellers of conventional design whereupon the advantages of the new design and the attainment of these advantages by the adopted constructions will become more apparent.

The conventional impellers heretofore provided have vanes which are either in the form of radially extending planes through the axis of rotation, or surfaces having straight line elements parallel to the axis, the sections of which by planes perpendicular to the axis are curved so that the exit angles at the peripheries are less than right angles. Both of these forms offer grave disadvantages.

First, the air entering the passages is subjected to two abrupt changes of direction of flow: first that occurring upon entrance as the flow changes from an axial direction to partake of the rotation of the rotor, and secondly, the change of flow to a radial direction towards the periphery. While stationary guide vanes are sometimes used to guide the inflowing air, there is still only a slight increase in efficiency, since large losses resulting from deflection nevertheless occur. Secondly, such vanes in the open radial type must be secured directly to the hub even for moderate speeds and it is impossible to locate auxiliary guide vanes to maintain proper flow between the flaring outer portions of the passages. One or two radially extending supporting walls are sometimes provided. Where none is provided to form the open type of impeller the air passages are usually closed by stationary walls of the casing, necessitating clearance which causes losses by leakage and eddies due to cross flow. While the above objectionable features are present at low speeds, additional factors render these impellers entirely impractical at very high speeds. The vanes have only relatively short lines of support at the hubs in proportion to their lengths. At high speeds, curved vanes are subject to enormous centrifugal stresses tending to force them to assume radial directions. Accordingly, even though backward curved vanes giving a discharge angle of less than 90° are theoretically desirable they cannot be used, and radial blades are almost exclusively used for high speeds. For high speeds, where radial blades have heretofore been used, the eye or inlet diameter is comparatively very large resulting in greatly increased relative velocity components at the inlet. Since the energies represented by the velocities are proportional to the squares of their values it is clear that tremendous losses will occur unless the air is very carefully handled at the inlet. Smooth, straight, gradually diverging inlet passages are a prime requisite, the crude hooks used on some forms of impellers giving no substantial cure.

The improved construction avoids these objections by providing substantially straight lines of flow from the entrance to the periphery, vanes having radial elements eliminating flexure due to centrifugal forces, and increased lines of attachment of the vanes to the discs so that in addition to the primary vanes, short guide vanes may be provided to maintain proper flow between the flaring peripheral portions of the primary vanes.

Figure 2:
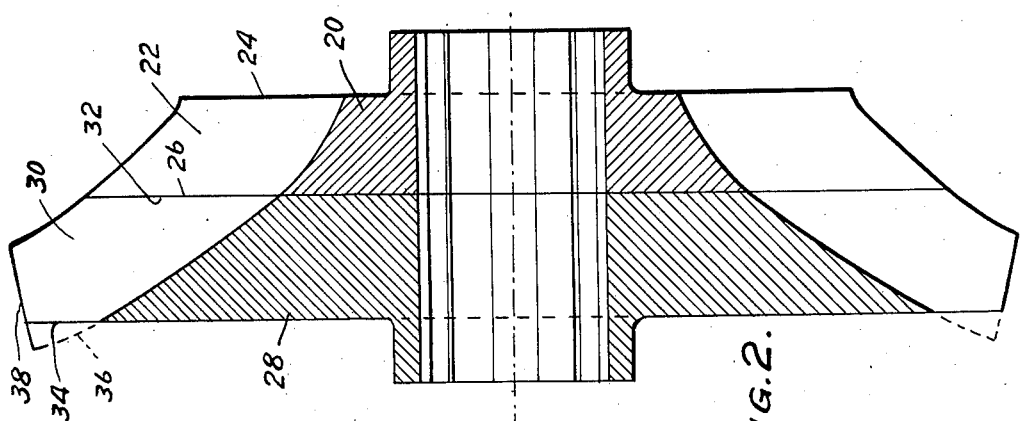
Fig. 2 is an axial section of the subject of Fig. 1.

The preferred form of impeller is that illustrated in Figs. 1 and 2. However, since the characteristics of the vanes or blades are more clearly brought out in the modifications of Figs. 3 and 4, reference will be first made thereto. The rotor 50 illustrated in these figures is, as pointed out in my application, Serial No. 481,469, provided with both impeller blades and turbine buckets, the latter not being illustrated in this case in connection with this modification.

The surface of the rotor 50 opposite the turbine buckets, namely the outer side towards the shaft, has as its surface 60 a portion of a hyperboloid of revolution, the portion of the hyperboloid used being evident from the continuation of the surface indicated by the lines 60a; that is, the surface used lies entirely to one side of the constricted portion of the hyperboloid. As is well known, a hyperboloid of revolution is not only the surface formed by rotation of a hyperbola about its minor axis, but is also the locus of a straight line rotating about an axis with which it has no common plane, so that the surface obviously has straight line elements. It follows conversely that, given a desired series of elements having certain directions relative to an axis of rotation, a hyperboloid surface may be constructed. It is this proposition which is used in designing the surface, as will be pointed out later.

In the present instance, certain equi-spaced grooves 62 are cut in the surface 60 along straight line elements thereof to serve to align the primary vanes, intermediate shorter similar straight grooves 64 being provided for the secondary vanes.

Reference to the construction lines in Fig. 3 will make clear the geometrical construction of a vane. As shown therein, a series of lines 66 may be constructed through the points of the center line of groove 62a perpendicular to the axis. There will result as the locus of these lines an elementary surface which may be considered to terminate at lines 68 and 69 where it intersects a conical surface 70 and a cylindrical surface 72, indicated in Fig. 5. This elementary surface is actually a skew surface of varying pitch, although under certain conditions it approximates a plane by which it may be replaced without departing from the invention. Each primary vane 74 may be considered to be built up upon this elementary surface so that the center of gravity of any section by a plane transverse to the axis of rotation will lie substantially in this surface. In other words, the elementary surface referred to lies substantially intermediate the faces of the vane.

Each secondary vane 76 may be considered to be similarly built up upon a similar elementary surface through grooves 64.

Preferably these vanes may be centered in the grooves and welded in place although it is obvious that other means of attachment might be adopted. Alternatively, the vanes might be cast integral with the hub, or the air passages might be formed by cutting out material from a block or forging.

The theoretical radially extending ruled surface upon which any blade is regarded as formed is a doubly ruled surface expressed in cylindrical coordinates by the equation $x = K \tan b$ in which $x$ is the distance between any radial element and the shortest perpendicular to the axis of rotation from the straight line element 62 chosen to define the surface, $b$ is the angle between the radial element and the axial plane including said shortest perpendicular, and $K$ is a constant determined by the required characteristics of the surface. The more general choice of coordinates will be clearer below since, while the blades may always be considered theoretically as extending from straight line elements of a hyperboloid, the surface of the rotor is not, in the preferred form of the invention, a hyperboloid.

The accomplishment of the various objects of the impeller design will now be clear. The impeller is arranged in a suitable casing to receive air from a space about the axis and to discharge into a diffusor or volute. The direction of flow through an air passage adjacent the surface of a blade will be along one set of straight line elements thereof. Knowing the mean speed of rotation and the amount of air delivered under normal conditions, the directions the straight line elements should have to "scoop up" the air in the supply chamber and pass it without impact and at a proper angle to the periphery may be easily determined. Knowing this, the shape of the blades, and, if used, the shape of the hyperboloidal surface, follow. When properly designed, the air enters the blades in the direction of their surfaces without impact, flows in straight lines. and is d'scharged without impact either into the volute or diffusor passages which are so arranged as to receive the air without shock. One of the most important features of the invention is the fact that the exit angle of the vanes is less than 90°, about 65° making for maximum efficiency. This is not possible in the case of any previously known vane construction which is free of bending stresses since these prior constructions must be radial at the discharge. It is well known that small discharge angles resulting in "backward" discharge give considerably increased efficiencies.

The peripheral sides of the passages are preferably closed by the surface of the casing although if desired an annular wall might be carried by the outer edges of the vanes.

That the basic surface on which the blades are formed is a doubly ruled surface consisting of the two sets of stra'ght lines above mentioned is most readily demonstrated by showing that the same surface is generated by both sets of straight lines.

Referring first to Fig. 7, OL represents the axis of rotation which is taken as the axis of cylindrical polar coordinates, O being the origin. Taking MON perpendicular to OL and MOL as the origin plane for the measurement of the coordinate angle $b$, we may consider the surface generated by a line PQ moving so as to be always perpendicular to OL and so as to always intersect a fixed line RS perpendicular to OM and at an angle $a$ to the plane MON. If RU is perpendicular to the plane MON and TV is a perpendicular from T, the intersection of PQ and RS, to RU, we have, if $x$, $r$ and $b$ are the coordinates of any point on PQ:

$$\tan a = \frac{x}{VT} = \frac{x}{VP \tan b} = \frac{x}{OR \tan b}$$

whence, $x = OR \tan a \tan b = K' \tan b$ where $K'$ is a constant equal to $OR \tan a$. Since PQ is radial, $r$ may have any value for a given $b$ and accordingly $x = K' \tan b$ is the equation of the generated surface.

Now, referring to Fig. 8 and using the same set of axes, consider the surface generated by a line JE moving always perpendicular to OM and always intersecting a fixed line CE perpendicular to the axis OL and making a fixed angle $c$ with the plane MOL. If ED is the perpendicular from E, the intersection of CE and JE, to MOL, and GF is the perpendicular from any point G on JE to MOL, OH being the coordinate $x$, we have, for any point G:

$$\frac{JF}{JD} = \frac{FG}{DE}$$

or, $$\frac{x}{JD} = \frac{r \sin b}{r \cos b \tan c} = \frac{\tan b}{\tan c}$$

whence, $$x = \frac{JD}{\tan c} \cdot \tan b = K'' \tan b$$

where $K''$ is a constant equal to $\frac{JD}{\tan c}$

Since the equations for the surfaces derived from the two modes of generation are similar and $K'$ may be made equal to $K''$ by a suitable choice of constants, it follows that any surface whose equation is $x = K \tan b$ consists of the two sets of straight lines defined above.

The same surface may be obviously represented in another fashion which, as will be evident below, is particularly useful, by considering OM as the axis of polar coordinates. In this case the equation of the surface becomes $$z = k \tan(90° - a) = \frac{k}{\tan a}$$

where $a$ is the angle between JE and the plane MON.

At the inlet edge of a blade, if $n$ is the inlet angle at a radius $r$, it is evident that:

$$\tan n = \frac{dx}{r.db} = \frac{K \sec^2 b'}{r},$$

where $b'$ is the constant value of $b$ corresponding to the leading element. Accordingly, with a proper choice of a blade to correspond with the flow, the inlet angle decreases as the radius increases in substantially the theoretically proper manner to insure absence of impact throughout the radial extent of the leading edge. This feature is of particular importance for high speed impellers of very high peripheral velocity or in which the difference between the outermost inlet radius and the discharge radius is small.

Of course, for a blade to have the precise theoretical properties resulting from the above construction, it would have to be of infinitesimal thickness. Actually, the blade may be considered as built upon the theoretical surface defined by $x = K \tan b$, or may be considered as included between two of such surfaces located with a small angle between them. As will be pointed out later in connection with a preferred method of generating the blades, there will be some incidental departure from the theoretical shape for mechanical reasons. However the blade may still be defined as substantially built upon the theoretical surface.

Straight line flow occurs at the inlet of each blade along the lines JE of Fig. 8 and substantially along these lines throughout the extent of the blade, slight deviation from such flow being occasioned by the decrease in cross-sectional area of the passage.

The mechanical advantages of the above construction of impeller blades are equally as great as the advantages resulting from the attainment of proper flow of the elastic fluid which is being compressed. It will be noted that the line along which a blade is secured to the disc or hub is very long compared with the blade area insuring maximum strength. Because of this and the curvature of surface 60 it is possible to provide the secondary guiding blades 76 between the primary blades in order to guide the stream and prevent eddies due to the fact that the divergence of the primary blades becomes too large to guide the flow without the auxiliary blades.

Because the elements of the blades are substantially radial, the centrifugal stresses are exerted in tension only within the blades and at their junctions with the rotor thus giving rise to strength capable of withstanding enormous peripheral speeds of the order of 1400 feet per second, or more.

While a specific design of the vane has been illustrated in Figs. 3 and 4, numerous changes which will still maintain the advantages of the invention are obviously within its scope. For example, a construction such as that described having the elements of the vane radial necessitates a slight departure from straight line flow through the outer portions of the passages in view of the terminations of the blades adjacent the diffusor. An alternative construction in which the walls of the vane would be straight lines throughout in the direction of flow might be adopted, the straight lines departing from the theoretical ones mentioned above to take care of the practical requirements of the arrangement of the diffuser, etc., indicated above. In such case the vane elements would depart slightly from a strict radial direction and from the theoretical surface $x = K \tan b$ though not to any extent which would involve the creation of destructive stresses.

In case separate blades are attached to the surface of a rotor as in Figs. 3 and 4, the surface of the rotor is preferably a hyperboloid of one nappe generated by the rotation of a straight line as described. This surface is readily produced by mere turning and automatically provides the straight lines marking the attachments of the blades. Furthermore, a straight line guiding surface for the gases is produced. It will, however, be obvious, particularly in view of what is stated below, that the surface between the blades may be other than hyperboloidal and though not hyperboloidal may guide the gases in straight paths. From the broadest standpoint, therefore, the blade may be defined, as indicated above, as substantially built upon the theoretical surface defined by the equation $x = K \tan b$.

The attachment of impeller blades along straight line elements of hyperboloidal surfaces of rotors has already been proposed. However, such blades have been made to extend axially rather than radially from their attachment so that both improper passages and failure under centrifugal stresses have resulted.

The design of impeller blades so far described, which provides one continuous skew surface for each vane, while theoretically best, cannot always be practically used. It is found that in certain cases, in order to obtain correct inlet angles and areas, the axial extent of the construction from the inlet plane to the outlet plane becomes greater than is desirable for a light and compact design. Furthermore, as will be more obvious hereafter, machining difficulties frequently arise in producing very large blades. These difficulties are avoided by an alternative design illustrated in the preferred modification of Figs. 1 and 2.

In this modification the complete impeller consists of two parts. The first, the inlet part, comprises a hub 20 on which are provided integral blades 22 having radial inlet edges 24 and radial outlet edges 26. Each of the blades 22 is substantially built upon the theoretical surface already defined. A second hub portion 28 together with the integral blades 30 forms the outlet section of the impeller blades 30 being provided with radial inlet edges 32 and rear edges 34 and being cut off at 38 to conform with the interior radius of a suitable diffuser. The radial elements 26 and 32 are arranged to contact when the two parts of the impeller are assembled. When the assembly upon the shaft takes place the result is substantially smooth passages in general without any noticeable break at the junction of the edges 26 and 32. If the theoretical surfaces upon which both sets of blades are built are the same there will be no break at the junction. However, it is usually preferred to build these blades upon two different theoretical surfaces so that there may be a very slight kink in the junction. In general, even though the constants of the two surfaces are considerably different the kink is quite negligible.

In a great many cases the number of vanes required for proper guidance of the fluid by the discharge section of a two piece impeller is larger than it is possible to accommodate on the small diameter of the inlet section. The latter is therefore provided with only one-half the number of vanes, which means that only every second vane of the completely assembled impeller continues clear through from the inlet to the discharge and that there are near the outlet an equal number of shorter auxiliary vanes between the main vanes.

If desired, it is not necessary that the rear edge of the blades 30 be radial as indicated at 34. Instead, the blades may be continued as indicated by the dotted line 36, a suitable stationary bounding wall forming the bottom of the air passage.

Before proceeding with a discussion of the preferred method of machining the impeller blades of Figs. 1 and 2 reference will be made to further modifications illustrated in Figs. 5 and 6. In Fig. 5 there is illustrated a disc 40 provided with blades 41 which may be formed integral therewith or which may be keyed thereto along the straight line elements of a theoretical or actual hyperboloidal surface. Between the diverging outer edges of the blades 41 are short guide blades 42 which may be secured to the disc surface as indicated. The arrangement in this figure is particularly adapted to a combined turbo-impeller construction in which buckets 43 are formed by slots cut into the surface of the disc 40.

In Fig. 6 there is illustrated a two part impeller somewhat along the lines of that illustrated in Figs. 1 and 2. In this case, however, the hub 44 carrying the inlet blade sections 45 is keyed by groove and slot arrangements to the main hub 47, the hub 44 being secured thereto by a nut 46 threaded on an extension of hub 47. In the specific arrangement illustrated in the figure the blade portions 48 would theoretically so closely approach planes that they are actually made as planes. This illustrates a somewhat extreme condition in which the various constants are such that this substitution of a plane for the theoretical skew surface is possible.

The properties of the theoretical surface of a blade make the formation of blades (and, as will become apparent hereafter, of the walls of turbine buckets) from a solid blank readily possible. The construction of Figs. 1 and 2 results from the practice of the manufacturing process of Figs. 9, 10 and 11. The set-up of a machine for cutting blades will be described first followed by a proof that the surfaces generated by machining are those theoretically desired.

The cutter of a milling machine has as its axis the line I—I, the cutter being, for the present theoretical purposes, considered as of infinitesimal radius, the practical form of cutter being hereafter discussed. A carriage 80 moves on the table of the machine along a path II—II in the direction of the arrow Y being propelled by an ordinary screw feed operated by crank 82. The carriage 80 supports a bracket 84 in which is journalled a spindle 86 about an axis III—III which intersects the axis I—I of the cutter at a right angle. The spindle 86 carries a face plate 88 in which there may be adjustably fixed a work supporting bracket 90 for holding the blank or forging 92 which is to be machined. The blank 92, which is conventionally illustrated, is adapted to be adjusted about its own axis and fixed during milling on the bracket 90, the arrangement being such that the axis IV—IV of the blank intersects axis III—III.

As progression of the carriage 80 along II—II takes place, the face plate 88 must swing in a predetermined fashion about III—III. This swing is determined by the engagement of the lower straight edge 94 of a member 95 with the upper straight edge 96 of a fixed member 97. Contact between 94 and 96 is maintained by the use of a suitable spring 99 or weight. As the carriage is fed, the blank is advanced and turned in such manner that the cutter on axis I—I generates the theoretical surface. Edge 94 intersects axis III—III.

To show this and also illustrate the necessary relationships of the various parts, reference may be had to Fig. 12. For simplicity of illustration in this diagrammatic figure, the straight edge 96 and cutter are considered as moving while the blank is considered as having its axis IV—IV rotating in a plane perpendicular to the fixed axis III—III in a manner determined by the movement of 96 relative to 94. Obviously, such movement of the cutter and edge 96 in the direction —Y will generate the same surface as the actual operation.

Comparing Figs. 8, 9 and 10, $a$ and $z$ may be identified. As indicated above, the generation of the desired surface requires $$z = \frac{k}{\tan a} \text{ or } \tan a = \frac{k}{z} = \frac{nk}{nz}$$

where $n$ may be any arbitrary constant chosen for convenience of the mechanical layout. The restraints on the milling operation are thus defined. In arranging the apparatus, straight edge 96 is first fixed horizontally at some height $nk$ above the horizontal plane through I—I. The blank may now be set on 90, and the face plate turned, until axis I—I is made to coincide with the position of one desired element (some JE of Fig. 8) of the desired surface, (though this particular element may in general not exist on the blade to be formed but only theoretically form a part of a continuation of a blade surface). Edge 96 may now be moved horizontally towards or from axis III—III until it contacts with edge 94. There is thus defined one point through which 96 must finally pass.

While the above is a mechanical visualization of the method involved in fixing 96, actually, of course this initial intersection would be calculated. The point above defined, designated W in Fig. 12, is located at a distance $nz'$ from a vertical plane through III—III, (the plane indicated by the base line of Fig. 12) and at a height $nk$ above the horizontal plane through I—I, $z'$ referring to the element chosen to determine the set-up. From Fig. 12 it is obvious that the condition tan $$a' = \frac{k}{z'}$$

is satisfied by this choice of W.

Having located point W, it now remains to determine $v$, the angle which 96 makes with the vertical plane through III—III. This is readily determined as indicated at the left of Fig. 12, since W, $z'$ and $y$ are known. From the figure it is obvious that if movement takes place so that the distance between I—I and IV—IV becomes any $z$, the equation $$z = \frac{k}{\tan a}$$

will remain satisfied. It follows that the theoretical surface will be generated from the blank by the cutter which has so far been assumed of infinitesimal radius.

From Fig. 12 it is obvious that the angle $w$, which is equal to $y+v$, satisfies the condition:

$$\tan w = \frac{n}{1 - n.\tan y + \tan^2 y}$$

From this it will be seen that tan $w=n$ when tan $y=O$ (i. e. $y=o$) or when tan $y=n$. In the latter case, which may sometimes be used, since as will be indicated below there is some range of choice of $y$, $w=y$ and accordingly $v=O$. Hence 96 may be parallel to III—III and setting it is thus rendered simpler.

In the above, it is to be noted that angle $y$ could be arbitrarily chosen and then, if the other constants were properly taken, the theoretical surface would follow. For theoretical accuracy, the radius of the cutter would have to be infinitesimal. With a cylindrical cutter of real radius, the theoretical surface is very closely approximated if $z$ is measured from the active side of the cutter to the axis of the blank.

However, blades whose faces are in accordance with the theory are not absolutely satisfactory from a practical standpoint since sometimes they would have considerably greater thickness at their discharge portions than at their inlet portions. This may be simply avoided by the use of a cutter such as 98 having a tapered cutting portion 100. If, however, a tapered cutter such as this is used, the two sides of a blade are caused to converge radially much more than is permissible if $y=O$, that is, if feed takes place in the direction III—III. To avoid this, the feed is caused to take place in the direction Y which causes the effective cutter diameter corresponding to any radial blade element to become smaller the nearer the cutter approaches the outer edge of the vane. Accordingly the required blade thickness is preserved throughout the radial extent of each blade. While the use of a tapered cutter causes some slight divergence of the blade surfaces from the theoretical, nevertheless the blades are substantially built up on the theoretical surface which in general forms a mean between the opposite surfaces.

The relationship of the tapered cutter to the parts during a cutting operation is indicated by the corresponding lines III—III and V—V in Figs. 9 and 11.

In many cases a single cut will produce the trailing side of one blade, the leading side of an adjacent blade, and the disc surface extending between the two as well. In such case the disc surface consists of a number of large fillets and does not in any way resemble a hyperboloid. In other cases the spacing between the blades is wider than a single cut would define. It is then necessary to make two or more cuts with the blank displaced suitably about its axis. The disc between the blades is then composed of two fillets having a section of disc surface between them.

In my application, Serial No. 481,469, I have disclosed turbine buckets in the form of cavities milled into suitable discs which in the case of a turbo-compressor arrangement carries on the side opposite the buckets impeller vanes of the type described above. In the arrangement illustrated in my prior application, the milled out buckets extend in a substantially radial direction with the inlet outermost so that the peripheral velocity at the inlet is greater than that at the outlet. It is easily determined that the maximum efficiencies obtainable by buckets of identical cavities having the same losses due to friction and shock but having different ratios of outlet to inlet peripheral velocities increase as the ratios decrease. In other words, if the ratio of outlet to inlet peripheral velocities is 0.5 the theoretical efficiency will be approximately 84.0% as compared with a theoretical maximum efficiency of 73.4% when inlet and discharge takes place at the same diameter.

When buckets are produced by milling as described in my prior application and flow of gases takes place inwardly in opposition to the centrifugal forces the efficiency can be very materially increased by making the exit angle smaller than the inlet angle. Inasmuch as this result is difficult to achieve by milling, the walls separating the discharge ends of the buckets are bent or twisted with the result that a decreased discharge angle is attained.

From the standpoint of thermal considerations the design of buckets mentioned above is quite satisfactory. However, there are certain shortcomings to this construction.

First, if a uniform thickness of the partition walls between the cavities is insisted upon, which is practically always the case, the cavities themselves must converge radially inward. This makes manufacture complicated and expensive and is almost invariably the cause of a ridge or undesirable unevenness in the circular rear wall of the bottom of the cavity which is due to the necessary change of position of the cutter when machining first one and then the other side wall. Such unevenness can only be removed by an additional machining operation.

Secondly, unless bending of the exit edges is resorted to the exit angle is fixed, being equal to the inlet angle. Bending of the exit edges is from a mechanical standpoint unsatisfactory. However, unless it is resorted to, the maximum possible efficiency cannot be obtained because this requires a considerably smaller exit angle than inlet angle, in general, smaller even than can be obtained by means of bending the partition walls at the exit to any extent mechanically permissible.

In view of the fact that efficiency increases with decrease of the value of the ratio between discharge and inlet diameters, it is desirable to discharge on a very small diameter. For a given inlet annulus the mean discharge diameter is more or less fixed by the characteristics of the bucket.

The buckets produced in accordance with the prior application are, in general, substantially semi-circular from which it follows that the fluid in passing through the bucket is turned around approximately 180°. Since the losses in any type of bucket are proportional to the total deflection of the fluid passing through it, a bucket design which has the same inlet and exit angles but redirects the fluid with a total deflection of less than 180° is more efficient.

Another shortcoming of this bucket is the fact that the flat partition wall between the buckets can at best be radial along one certain line only, the rest of the wall being not strictly radial and therefore subject to bending stresses which are of a dangerous magnitude in many cases where high rotational velocities are attained.

By applying further the theory of the impeller vanes above described and the method of machining them from a solid blank, it is found that a new type of radial turbine bucket may be produced cut directly into the turbine disc and which overcomes various objections to the former arrangement, while it retains all of its advantages. The most important feature of this new bucket is the fact that the wall between two adjacent bucket cavities has exactly the same shape as the impeller blades already described and may similarly be defined as built up on a surface defined by the equation $x = K \tan b$. The cavities are formed by removing the necessary material from a blank in a manner similar to that already described before by means of the same machining arrangement as is useable to remove the material between the impeller blades, this arrangement being that illustrated in Figs. 9, 10 and 11. The new buckets are illustrated in the arrangement shown in Figs. 13 and 14, the latter of which discloses the method of their formation.

In Fig. 13 the shaft 102 supports the disc 104 of the combined turbine and impeller. Secured to the main disc by an annular dovetailing arrangement are hubs 106 and 108 which carry auxiliary guiding surfaces later described. On the impeller side the disc 104 carries blades 110 which are of the form above mentioned being built up on the surface $x = K \tan b$. The impeller blading arrangement is made up not only of the discharge blade portions 110 but also inlet portions 112 carried by the hub 106, the inlet portions 112 being also of the theoretical type and the assembly being in general similar to that illustrated in Figs. 1 and 2. The discharge portions 110 deliver air into the diffuser or other suitable outlet passage 114.

In the arrangement illustrated in Fig. 13 it will be noted that the hub 104 does not provide the necessary guiding surface adjacent the discharge of the blades 110, suitable guidance being provided by a stationary annular member 116 which extends between the blades 110 and the outermost portion 118 of the disc 104, suitable air space 120 being provided between the disc and the ring 116. The advantages of this construction will be described later. Labyrinthine tightening is provided by the teeth on 116 and the disc.

The gas, or steam, for driving the turbine passes from the chest, or accumulator 122, through nozzles 124 into the buckets defined by the walls 126. The walls defining these bucket passages are similar to the impeller blades heretofore described and may be defined as substantially built upon the theoretical surface defined by the equation $x = K \tan b$. The hub 108 provides extensions 128 for these bucket confining walls, which extensions are also formed on the same theoretical surface, although, as in the case of the two portions of the impeller blades the value of K may be different for the intake and discharge portion of the surfaces. It is to be noted that the primary difference between the impeller and bucket arrangements is that the walls of the latter must be suitably shaped at their outer ends to receive the discharge from the nozzle 124. The gases are guided inwardly after suitable deflection and discharged adjacent the shaft. In certain cases, of course, the portion of the shaft at the left of the disc 104 would not exist. That is, the rotor would be of an overhung type.

It will be noted that the disc 104 terminates short of the inlet portion of the buckets and that the outer portions 130 of the bucket confining walls are free of the disc proper. A fixed annular ring member 132 which is closely adjacent the portions 130 of the walls serves to provide suitable guidance for the driving gases entering the buckets. This removal of the disc at the peripheral portions of the walls 126 not only has utility in the formation of the buckets, as will be pointed out below, but also serves to remove unnecessary dead weight inasmuch as any portion of the disc, if it were produced along 130, would have to be carried by the bucket walls. Accordingly, its portions between the bucket walls would have to be self-supporting and the stresses on the walls themselves would be greatly increased due to their increased centrifugal loading.

The buckets of the present arrangement may be cut out in precisely the same fashion as the impeller blades are formed in the method illustrated in Figs. 9 to 11. In this case a suitable cutter 134 is provided with a tapering cutting surface 136 and also at its outer end with a rounded cutting surface 138 which is instrumental in suitably cutting the outer portions of the guiding surface of the disc so that the necessary deflection of gases for a turbine action is attained. The fact that the supporting disc proper does not exist at 130 makes it possible to use a milling cutter which is supported at both ends as will be obvious from the figures.

The improved construction of turbine buckets is found particularly suitable not only in a turbine driven by the discharge gases of an internal combustion engine but also in forming the low pressure stage of a steam turbine in which the gases may be passed through primary buckets carried by the periphery of a turbine disc and then redirected into slots formed in the side of the same disc and discharged adjacent the axis of rotation. In the use of buckets to form a low pressure part of a steam turbine they are capable of handling much larger volumes of steam at considerably higher speeds and with better efficiency than any other type of turbine wheel hitherto known.

The advantages of the improved bucket design in general application in turbines lie not only in mechanical features but also in thermodynamic features.

First, a cheap, simple and efficient method of machining results in smooth perfect passages for the working fluid whereby losses due to friction and impact are very substantially reduced.

Second, any desired combination of inlet angle and exit angle can be obtained. The outlet surface is inherently warped so as to give a varying discharge angle and correct discharge condition at each point along the outlet edge. This feature it will be observed corresponds to the feature of the impeller which gives its inlet portion a proper entrance angle at any radius. The ratio of the mean inlet diameter to the mean discharge diameter can be raised to any desired value up to the possible maximum defined by mechanical considerations, so that as a result the efficiency may be correspondingly increased.

In the new design the proper re-direction of the working fluid is accomplished with a minimum angular deflection of it in the bucket proper. This feature of it also results in a decrease in friction and impact losses.

The construction is very strong, permitting speeds and temperatures of a magnitude never obtained before due to the fact that, first, all dead load can be eliminated, second, all bending is avoided since each section through a bucket wall by a plane perpendicular to the axis is perfectly radial, third, any suitable radial decrease of the vane thickness can be obtained in the same manner as similar results may be attained in the case of machining an impeller blade, and, fourth, the complete rotor may be machined from a single solid piece of steel.

The design is furthermore very flexible, and can be adapted to a vast variety of specific arrangements. The resulting channels have invariably a gently curved shape and are well defined even without a stationary guiding lip which protrudes into a recess of the blade contour.

By the use of the special discharge section of the type indicated at 128 the passage for the working fluid may be made smoothly continuous for the conveyance of the fluid to the smallest possible discharge diameter where it is spread over a large discharge area so as to make it possible to thereby use the smallest possible exit angles, all of which result in the highest efficiency. In cases where the design is used in a gas turbine as contrasted with a steam turbine the large heated surfaces due to the auxiliary discharge vanes make the design less attractive unless the discharge section is separated from the main disc by an insulating space. In a turbo-compressor arrangement it is very important that care be taken not to heat the air which is undergoing compression any more than is absolutely necessary for cooling of the turbine. In the design illustrated in Fig. 13 this is accomplished due to two features of the construction. First, the disc which causes the transfer of heat from the turbine to the air undergoing compression is cut down so that a minimum of its surface is exposed to the working fluid. This it will be noted is one of the advantageous features of cutting out any portion of the turbine disc adjacent the portions 130 of the bucket defining walls. It is also the function of the serration 120 to reduce the transfer of heat from the buckets to the impeller blades and to reduce leakage from one side to the other. That is, the passage 120 constitutes a dead air space which, if necessary, may be provided with a continuous flow of cool air. In certain cases, it may be desirable to make this serration even deeper than indicated in Fig. 13. While effective cooling of the buckets still occurs, nevertheless, overheating of the air being compressed is avoided.

From the above it will be understood that the improved design of boundary surfaces for fluid guiding passages is applicable not only to impellers but also to a construction of turbine buckets. Furthermore, the same improved method of machining is applicable in the two cases.

This continuous flow of cool air may be provided by designing and proportioning the impeller and turbine in such manner that the pressure on the impeller side of 120 is under all conditions of operation slightly higher than the pressure on the gas side whereby cool air flows through 120 and mixes with the gases which are expanding in the turbine buckets. The cooling air itself will eventually also expand in the turbine buckets whereby the energy that was used to compress it is regained. This means that even a substantial cooling air flow does not constitute a loss of energy.

What I claim and desire to protect by Letters Patent is:

1. An elastic fluid mechanism including a rotor mounted for rotation about an axis, and provided with passages for elastic fluid bounded in part by outwardly extending walls each of which substantially conforms to a surface expressible in cylindrical coordinates by the equation $x = K \tan b$, in which $x$ and $b$ are measured along and about the axis respectively, the walls forming acute angles with axial planes.

2. A centrifugal compressor having a rotor mounted for rotation about an axis and including a supporting disc and vanes carried thereby and defining fluid passages, each of said vanes conforming, at least in part, substantially to a surface expressible in cylindrical coordinates by the equation $x = K \tan b$, in which $x$ and $b$ are measured along and about the axis respectively, said vanes forming acute angles with axial planes.

3. A centrifugal compressor having a rotor mounted for rotation about an axis and including a supporting disc and vanes carried thereby and defining fluid passages, each of said vanes conforming, at least at its inlet portion, substantially to a surface expressible in cylindrical coordinates by the equation $x = K \tan b$, in which $x$ and $b$ are measured along and about the axis respectively, said vanes forming acute angles with axial planes.

4. A centrifugal compressor having a rotor mounted for rotation about an axis and including a supporting disc and vanes carried thereby and defining fluid passages, said vanes extending substantially radially outwardly from the disc and also extending from their intake portions to their discharge portions substantially in the direction of straight lines, said vanes forming acute angles with axial planes.

5. A centrifugal compressor having a rotor mounted for rotation about an axis and including a supporting disc comprising two parts, and two-part vanes, one of the parts of each vane being carried by one part of the disc and the other part being carried by the other part of the disc, the vane parts carried by at least one of the parts of the disc conforming substantially to a surface expressible in cylindrical coordinates by the equation $x = K \tan b$, in which $x$ and $b$ are measured along and about the axis respectively, said last named vane parts forming acute angles with axial planes.

6. A centrifugal compressor having a rotor mounted for rotation about an axis and including a supporting disc comprising two parts, and two-part vanes, one of the parts of each vane being carried by one part of the disc and the other part being carried by the other part of the disc, the vane parts carried by both of the parts of the disc conforming substantially to a surface expressible in cylindrical coordinates by the equation $x = K \tan b$, in which $x$ and $b$ are measured along and about the axis respectively, K having one value for the vanes carried by one part and a different value for the vanes carried by the other part, said vane parts forming acute angles with axial planes.

7. A centrifugal compressor having a rotor mounted for rotation about an axis and including a supporting disc and vanes carried thereby and defining fluid passages, said disc having a guiding surface at least a portion of which is substantially hyperboloidal, and the vanes extending substantially radially outwardly from straight line elements of said surface, said vanes forming acute angles with axial planes.

8. A centrifugal compressor having a rotor mounted for rotation about an axis and including a supporting disc and vanes carried thereby and defining fluid passages, said vanes including primary vanes extending from the intake to the discharge conforming substantially to a surface expressible in cylindrical coordinates by the equation $x = K \tan b$, in which $x$ and $b$ are measured along and about the axis respectively, said vanes forming acute angles with axial planes, and other shorter secondary vanes of similar construction located between the diverging outer portions of the primary vanes.

9. A rotor mounted for rotation about an axis and including a supporting disc including two parts, one of said parts being substantially solid at the axis of rotation, and the other of said parts having an opening therethrough adjacent the axis of rotation, the two parts being fitted together by interengaging continuous annular projections and grooves of substantial axial extent, and two part elements providing fluid guiding passages, one of the parts of each element being carried by one part of the disc and the other part being carried by the other part of the disc, said interengaging projections and grooves providing a transmission of stresses from the last named part to the former whereby the latter is enabled to operate at very high speeds.

10. A rotor mounted for rotation about an axis and including a supporting disc including two parts, one of said parts being substantially solid at the axis of rotation, and having an integral axial extension, and the other of said parts having an opening therethrough adjacent the axis of rotation receiving said integral extension, the two parts being fitted together by interengaging continuous annular projections and grooves of substantial axial extent, and two part elements providing fluid guiding passages, one of the parts of each element being carried by one part of the disc and the other part being carried by the other part of the disc, said interengaging projections and grooves providing a transmission of stresses from the last named part to the former whereby the latter is enabled to operate at very high speeds.

11. A rotor mounted for rotation about an axis and including a supporting disc including two parts, one of said parts being substantially solid at the axis of rotation, and having an integral axial extension, and the other of said parts having an opening therethrough adjacent the axis of rotation receiving said integral extension, the two parts being fitted together by interengaging continuous annular projections and grooves of substantial axial extent, a member threaded on said extension and serving to hold said parts together, and two part elements providing fluid guiding passages, one of the parts of each element being carried by one part of the disc and the other part being carried by the other part of the disc, said interengaging projections and grooves providing a transmission of stresses from the last named part to the former whereby the latter is enabled to operate at very high speeds.

12. A rotor mounted for rotation about an axis and including a supporting disc including two parts, one of said parts having an integral axial extension, and the other of said parts having an opening therethrough adjacent the axis of rotation receiving said integral extension, the two parts being fitted together by interengaging continuous annular projections and grooves of substantial axial extent, means for holding said parts together, and two part elements providing fluid guiding passages, one of the parts of each element being carried by one part of the disc and the other part being carried by the other part of the disc, said interengaging projections and grooves providing a transmission of stresses from the last named part to the former whereby the latter is enabled to operate at very high speeds.

13. A rotor mounted for rotation about an axis and including a supporting disc including two parts, one of said parts having an opening of substantial size therethrough adjacent the axis of rotation whereby it is substantially weaker in resistance to radial stresses than the other part, the two parts being fitted together by interengaging continuous annular projections and grooves of substantial axial extent, means for holding said parts together, and two part elements providing fluid guiding passages, one of the parts of each element being carried by one part of the disc and the other part being carried by the other part of the disc, said interengaging projections and grooves providing a transmission of stresses from the first named part to the latter whereby the former is enabled to operate at very high speeds.

RUDOLPH BIRMANN.